US008101260B2

(12) United States Patent
Tatsumi

(10) Patent No.: US 8,101,260 B2
(45) Date of Patent: Jan. 24, 2012

(54) FLOCKED METAL PLATE, METHOD OF PRODUCING FLOCKED METAL PLATE, ROOFING MATERIAL AND DUCT FOR AIR-CONDITIONING SYSTEM

(75) Inventor: Teruyuki Tatsumi, Chiyoda-ku (JP)

(73) Assignee: Toyo Kohan Co., Ltd., Tokyo (JP)

( * ) Notice: Subject to any disclaimer, the term of this patent is extended or adjusted under 35 U.S.C. 154(b) by 486 days.

(21) Appl. No.: 12/303,084

(22) PCT Filed: Mar. 26, 2007

(86) PCT No.: PCT/JP2007/056151

§ 371 (c)(1), (2), (4) Date: Feb. 17, 2009

(87) PCT Pub. No.: WO2007/141949

PCT Pub. Date: Dec. 13, 2007

(65) Prior Publication Data

US 2009/0208694 A1 Aug. 20, 2009

(30) Foreign Application Priority Data

May 30, 2006 (JP) ................................ 2006-150665
Mar. 8, 2007 (JP) ................................ 2007-058395

(51) Int. Cl.
*B32B 3/14* (2006.01)
*B32B 5/02* (2006.01)
*B05D 1/16* (2006.01)

(52) U.S. Cl. .............. 428/90; 428/95; 428/97; 427/464; 427/462; 427/463; 427/466; 427/197; 427/198; 427/200

(58) Field of Classification Search .................... 428/90, 428/95, 97; 427/462, 463, 464, 466, 197, 427/198, 200
See application file for complete search history.

(56) References Cited

U.S. PATENT DOCUMENTS

| | | | | |
|---|---|---|---|---|
| 3,973,059 | A * | 8/1976 | Brown et al. | 427/180 |
| 3,999,003 | A | 12/1976 | Chevrolet et al. | |
| 4,064,297 | A * | 12/1977 | Power et al. | 428/86 |
| 4,218,501 | A | 8/1980 | Kameya et al. | |
| 4,421,809 | A * | 12/1983 | Bish et al. | 428/90 |
| 4,482,593 | A * | 11/1984 | Sagel et al. | 428/90 |
| 4,587,149 | A * | 5/1986 | Murachi | 428/90 |
| 4,721,642 | A * | 1/1988 | Yoshimi et al. | 428/90 |
| 4,734,307 | A * | 3/1988 | Thorsrud | 428/90 |
| 5,403,638 | A * | 4/1995 | Yanagizawa et al. | 428/90 |
| 6,143,390 | A * | 11/2000 | Takamiya et al. | 428/90 |
| 6,517,952 | B1 * | 2/2003 | Gustafsson | 428/608 |
| 6,736,899 | B1 * | 5/2004 | Abe et al. | 118/634 |
| 7,097,711 | B1 * | 8/2006 | Abe et al. | 118/621 |
| 7,211,298 | B2 * | 5/2007 | Tatsumi | 427/464 |
| 2003/0205073 | A1 | 11/2003 | Tatsumi | |

FOREIGN PATENT DOCUMENTS

| | | | | |
|---|---|---|---|---|
| EP | 1075876 | A2 | | 2/2001 |
| JP | 53133080 | A | * | 11/1978 |
| JP | 05118813 | A | * | 5/1993 |
| JP | 05138813 | A | * | 6/1993 |
| JP | 06227864 | A | * | 8/1994 |
| JP | 10-44276 | | | 2/1998 |
| JP | 10258472 | A | * | 9/1998 |
| JP | 11295603 | A | * | 10/1999 |
| JP | 2001046923 | A | * | 2/2001 |

* cited by examiner

*Primary Examiner* — Cheryl Juska
(74) *Attorney, Agent, or Firm* — Browdy and Neimark, PLLC

(57) ABSTRACT

It is intended to provide a flocked metal plate, which has a hydrophilic nature and is excellent in water retention property and water absorbing property, and a method of producing the flocked metal plate. A flocked metal plate having a flocked layer, which is formed by implanting short fibers as short fiber bundles in a synthetic resin adhesive layer provided at least one face of a metal plate or a surface treated metal plate, wherein the synthetic resin adhesive layer is made a hydrophilic synthetic resin adhesive layer, the short fibers implanted in the synthetic resin adhesive layer are made hydrophilized short fibers, and the short fibers are implanted in the synthetic resin adhesive layer to give a flocked layer having short fiber bundles at as high density as possible, thereby giving a flocked metal plate carrying a flocked layer having been made a flocked layer which exhibits a hydrophilic nature, water retention property and water absorbing property.

10 Claims, 1 Drawing Sheet

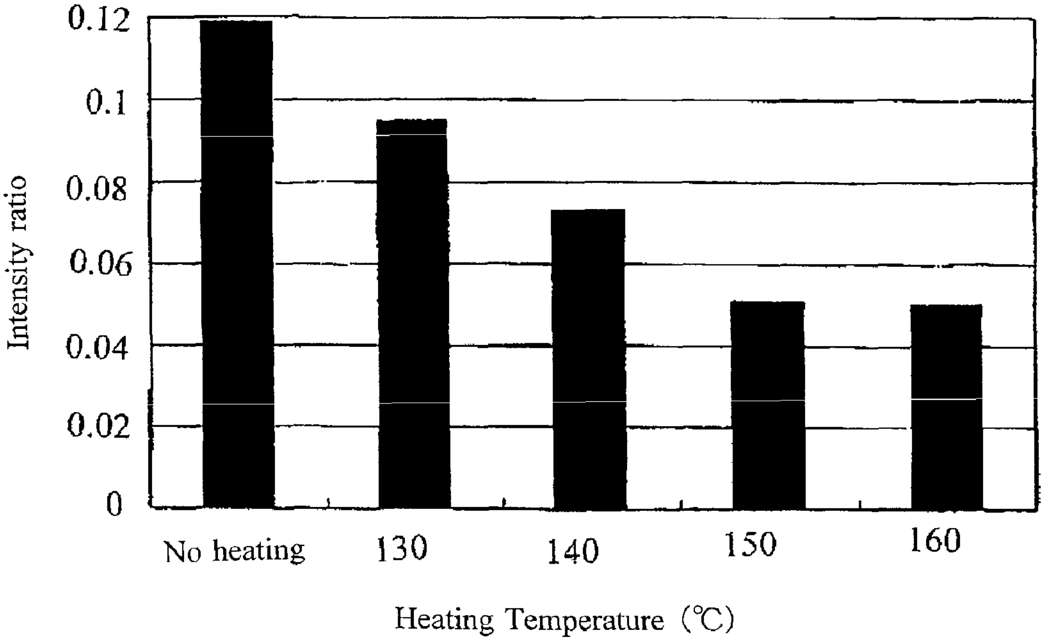
0.12
0.1
0.08
0.06
0.04
0.02
0
Intensity ratio
No heating
130
140
150
160
Heating Temperature (℃)

FLOCKED METAL PLATE, METHOD OF PRODUCING FLOCKED METAL PLATE, ROOFING MATERIAL AND DUCT FOR AIR-CONDITIONING SYSTEM

TECHNICAL FIELD

The present invention relates to a flocked metal plate which is used as a construction material for making a metal-made roof or eaves of a building, ceilings or a wall paneling in the inside of a building, a duct for an air-conditioning system arranged in an inner space of a building or which is used as a structural material other than the construction material, a manufacturing method of the flocked metal plate, a roofing material and a duct for an air-conditioning system.

BACKGROUND OF THE INVENTION

The inventors of the present invention have made a prior art search on a flocked metal plate which is made by forming a flocked layer made of short fiber bundles on a synthetic resin adhesive layer formed on a surface of a metal plate with a high flocking density and is used as a construction material. As a result of the prior art search, there has been disclosed a construction material which is manufactured such that a steel sheet is used as a substrate, rustproofing is applied to the substrate, a synthetic resin adhesive layer which is a short-fiber implanting layer is directly formed on the substrate using an specially blended synthetic resin adhesive, and non-metal fiber bundles are implanted in the synthetic resin adhesive layer thus forming a flocked layer (see patent document 1, for example). Further, there has been also disclosed a construction material which is manufactured such that a steel sheet is used as a substrate, chromate treatment or the like is applied to the substrate, a synthetic resin adhesive layer which is a short-fiber implanting layer is formed on the substrate using an specially blended synthetic resin adhesive while interposing a primer layer on a surface of the steel sheet treated with chromate or the like without directly forming a synthetic resin adhesive layer which is the short-fiber implanting layer on the steel sheet, and short fiber bundles are implanted in the synthetic resin adhesive layer with high flocking density thus forming a flocked layer (see patent document 2, for example).

In patent document 1, in applying the synthetic resin adhesive to the substrate, the synthetic resin adhesive is applied by spray coating or the like and hence, viscosity of the synthetic resin adhesive layer which constitutes the short-fiber implanting layer is low whereby there arises a drawback that an adhesive strength between a surface of a metal plate and the synthetic resin adhesive layer constituting the short-fiber implanting layer and an adhesive strength between the synthetic resin adhesive layer and short fibers which are implanted in the synthetic resin adhesive layer deteriorate. In Patent Document 2, a primer layer is required and necessitates primer coating and a drying apparatus therefor, thereby a manufacturing cost is increased.

The inventors of the present invention previously filed patent applications (see patent documents 3 and 4, for example) on a technique which differs from the technique disclosed in the publication referred to as patent document 2. That is, the inventors of the present invention previously filed the patent applications on a flocked steel sheet which is manufactured by directly forming a synthetic resin adhesive layer which constitutes a short-fiber implanting layer on a surface treated steel sheet without interposing a primer layer and by implanting short fibers on the synthetic resin adhesive layer as short fiber bundles at high density and which is used as a construction material.

Here, in using the flocked metal plate which constitutes the construction material as a metal-made roof or eaves of a building, a surface of the flocked metal plate on which a flocked layer is not formed is placed on an outer side of the roof or eaves (forming an upper surface of the roof or eaves), and a surface of the flocked metal plate on which the flocked layer is formed is placed on an inner side of the roof or eaves (forming a lower surface of the roof or eaves). When a metal roof or eave is made of a flocked metal plate composed of a construction material produced by employing the prior art stated above, the flocked metal plate composed of the construction material as a metal roof or eave material has dew formed on its inner and outer surfaces by natural phenomena caused by changes in weather, especially a phenomenon of radiation cooling occurring at the dawn of a fine day in winter (a phenomenon producing a temperature difference of 5° C. to 6° C. between the environment and the flocked metal plate). The flocked layer of the flocked metal plate made as a construction material employing the prior art stated above is a flocked layer formed by forming a synthetic resin adhesive layer as a short fiber implanting layer from a synthetic resin adhesive prepared without taking hydrophilicity into account, and employing short fibers prepared without taking hydrophilicity into account to implant bundles of short fibers in that layer.

That is, the flocked metal plate which is manufactured by the conventional technique has not paid any consideration with respect to a means which can prevent falling of dews which are generated in the synthetic resin adhesive layer constituting the short-fiber implanting layer and the flocked layer which is formed of short fibers which are implanted on the synthetic resin adhesive layer as short fiber bundles at high density. Accordingly, when a roof is constructed using the flocked metal plate manufactured by the prior art, dews which are generated in the flocked layer of the flocked metal plate fall as drops from tip ends of the short fiber bundles thus causing following drawbacks. That is, people standing or sitting below the roof or products placed below the roof become wet with water, the dews stains clothing of a person, or the dews spoil a commercial value of products. Particularly, even when the product is not completely wet with water but absorbs moisture therein due to slight leaking of water from the roof, this may also cause drawbacks such as deterioration of the commercial value of the product.

Further, when rainwater or snowmelt infiltrates into the flocked layer, a phenomenon similar to the above-mentioned phenomenon occurs.

Still further, to consider a duct for air-conditioning system which is manufactured using a conventional flocked metal plate, the dew condensation occurs on a flocked layer of the flocked metal plate which constitutes an outer surface of the duct at the time of starting the use of the air-conditioning system. When dews fall as water droplets, the dews cause a drawback that a clothing of a person below the air-conditioning system is stained with water droplets, or merchandise below the air-conditioning system or the like are also stained with water droplets leading to the degradation of a commercial value of the products.

The inventors of the present invention have come up with an idea that, to prevent dews generated in the flocked layer of the flocked metal plate or rainwater or snowmelt soaked into the flocked layer from falling from tip ends of the short fiber bundles which form the flocked layer, it is necessary to impart hydrophilicity to the synthetic resin adhesive layer which constitutes the short-fiber implanting layer and the flocked layer which is formed on the synthetic resin adhesive layer as short fiber bundles so that the synthetic resin adhesive layer and the flocked layer exhibit water retention property. The inventors of the present invention also have come up with an idea that, to realize the above-mentioned constitution, it is necessary to apply particular improvements to the synthetic resin adhesive layer which is the short-fiber implanting layer constituting the flocked layer formed on the flocked metal plate, short fibers which are implanted in the synthetic resin adhesive layer, a flocked state of the short fiber bundles formed of short fibers and the like.

That is, the inventors of the prevent invention have considered that, with respect to the flocked layer, besides applying the particular improvements to the synthetic resin adhesive layer which is the short-fiber implanting layer for forming the flocked layer and the short fibers which are implanted in the synthetic resin adhesive layer, it is necessary to form the short fiber bundles in a flocked state which allows the flocked layer to exhibit a capillary phenomenon acting in the flocked layer at maximum.

Patent document 5 discloses a technique in which two electrodes consisting of a first electrode and a second electrode are arranged in an electrostatic flocking chamber along a feeding path of a work to be flocked, high-voltage static electricity is applied to the first electrode and high-voltage static electricity which is lower than the high-voltage static electricity applied to the first electrode is applied to the second electrode thus enhancing the flocking density of fibers flocked on the work which passes the electrostatic flocking chamber. However, this document fails to disclose a technique of the present invention which allows a flocked layer of a flocked metal plate to exhibit hydrophilicity, water retention property, and water absorbing property using a work formed of an elongated metal plate which passes an electrostatic flocking chamber.

Further, in manufacturing the flocked metal plate, the inventors of the present invention also have made a finding that the adjustment of drying temperature after flocking the short fibers on the synthetic resin adhesive layer which is the short-fiber implanting layer formed on the metal plate influences water retention property, water absorbing property or hydrophobicity of the flocked layer formed on the flocked metal plate.

Following is the information on prior-art documents relating to the present invention.

Patent document 1: JP-A-5-138813
Patent document 2: JP-B-62-27864
Patent document 3: Japanese Patent No. 2956033
Patent document 4: Japanese Patent No. 3001451
Patent document 5: JP-A-2001-46923

DISCLOSURE OF THE INVENTION

Task to be solved by the Invention

The task to be solved by the present invention is to provide a flocked metal plate having following functions and effects and a method of manufacturing such a flocked metal plate. That is, with respect to a flocked layer of the flocked metal plate, the flocked layer is formed of a flocked layer which can overcome drawbacks caused by the flocked layer of the conventional flocked metal plate. The flocked layer is formed of a synthetic resin adhesive layer which is a short-fiber implanting layer formed on a flocked metal plate and short fiber bundles which are implanted in a synthetic resin adhesive layer, and the flocked layer possesses hydrophilicity and exhibits a capillary phenomenon at maximum. Such a flocked layer becomes a flocked layer which allows the flocked layer to exhibit hydrophilicity, water retention property and water absorbing property. Accordingly, when a roof, eaves or an air-conditioning system duct is manufactured using the flocked metal plate, it is possible to prevent falling of dews which are generated in the flocked layer of the flocked metal plate or it is also possible to prevent rainwater or snowmelt infiltrated into the flocked layer of the flocked metal plate used as a roofing material from falling from the flocked layer water droplets and hence, it is possible to overcome drawbacks that a clothing of a person below a roof, eaves or a duct formed of the flocked metal plate or merchandise below such a roof, eaves or duct gets wet with fallen water droplets or absorbs moisture.

Means for Overcoming the Task

It is an object of the present invention to provide a flocked metal plate which can prevent a phenomenon that dews which are generated by temperature difference or rainwater or snowmelt which is impregnated into a flocked layer falls as water droplets. The flocked metal plate is constituted such that a synthetic resin adhesive layer which is a short-fiber implanting layer formed on a metal plate or a surface-treated metal plate possesses hydrophilicity, short fibers which are implanted in the synthetic resin adhesive layer are formed of hydrophilized short fibers, and the short fibers are implanted in the synthetic resin adhesive layer at high density thus forming a flocked layer which is formed of short fiber bundles and exhibits hydrophilicity, water retention property and water absorbing property.

As a means for overcoming drawbacks, the present invention provides a flocked metal plate having a flocked layer which is formed by implanting short fibers as short fiber bundles in a synthetic resin adhesive layer which is formed on at least one surface of a metal plate or a surface-treated metal plate, wherein the synthetic resin adhesive layer is formed of a hydrophilic synthetic resin adhesive layer, the short fibers implanted in the synthetic resin adhesive layer are formed of hydrophilized short fibers, the short fibers are implanted in the synthetic resin adhesive layer to form the flocked layer having the short fiber bundles at as high density as possible, whereby the flocked metal plate has the flocked layer which exhibits hydrophilicity, water retention property and water absorbing property.

The present invention is characterized in that the hydrophilic synthetic resin adhesive layer is made of a synthetic resin which contains styrene-acrylate-ester copolymer as a main component.

The present invention is characterized in that the hydrophilized short fibers have surfaces thereof covered by coating with an oxide or an hydrous oxide of Al, Ti, Zr, Si, Cr, Ni, Zn, Sn, Mn, Cu, Co, Fe, Mg or Ca, or a compound which is a mixture of the oxide and the hydrous oxide of Al, Ti, Zr, Si, Cr, Ni, Zn, Sn, Mn, Cu, Co, Fe, Mg or Ca.

The present invention is characterized in that the hydrophilized short fibers have surfaces thereof covered by coating with a film which contains polysiloxane or an inorganic siloxane-based compound.

The present invention provides a manufacturing method of a flocked metal plate which includes the steps of:

unwinding a continuous metal plate or a continuous surface-treated metal plate formed in a roll shape;

applying a synthetic resin adhesive for forming a synthetic resin adhesive layer which constitutes a short-fiber implanting layer which exhibits hydrophilicity to at least one surface of the unwound continuous metal plate or the unwound continuous surface-treated metal plate by coating, electrostatically flocking hydrophilized short fibers on a synthetic-resin-adhesive applied surface at high density, wherein the continuous metal plate or the continuous surface-treated metal plate to which the synthetic resin adhesive is applied by coating is passed through an electrostatic flocking chamber in such a manner that the continuous metal plate or the continuous surface-treated metal plate passes a first electrode to which high-voltage static electricity is applied and, thereafter, passes a second electrode to which a high-voltage static electricity lower than the high-voltage static electricity applied to the first electrode is applied thus performing electrostatic flocking which implants the hydrophilized short fibers in an erected manner to form short fiber bundles in a process that the continuous metal plate or the continuous surface-treated metal plate passes the electrostatic flocking chamber; and drying by heating and cooling the metal plate or the surface-treated metal plate thus forming the synthetic resin adhesive layer and the short fiber bundles constituted of the short fibers as a flocked layer which maintains hydrophilicity on the metal plate or the surface-treated metal plate; and winding the metal plate or the surface-treated metal plate on which the synthetic resin adhesive layer and the flocked layer are formed in a roll shape.

The present invention is characterized in that the synthetic resin adhesive layer is formed such that the synthetic resin adhesive is applied to a whole surface of an adhesive coating roll, the synthetic resin adhesive is removed from a portion of a roll surface of the adhesive coating roll corresponding to a portion of the metal plate or the surface-treated metal plate in which the short fibers are not implanted and, thereafter, the synthetic resin adhesive is transferred to the metal plate or the surface-treated metal plate side.

The present invention is characterized in that the synthetic resin adhesive layer is formed such that the synthetic resin adhesive is partially transferred to a metal plate side by applying the synthetic resin adhesive by coating using an adhesive coating roll which has an uneven surface.

The present invention is characterized in that the drying by heating is performed with a temperature of the metal plate set to a value less than 150° C. for maintaining hydrophilicity of the hydrophilized short fibers thus allowing the flocked layer to exhibit hydrophilicity, water retention property and water absorbing property.

The present invention provides a roofing material which is formed of the flocked metal plate and is configured to use a flocked surface of the flocked metal plate as a lower surface thereof.

The present invention provides a duct for air-conditioning system which is formed of the flocked metal plate and is configured to use a flocked surface of the flocked metal plate as an outer surface thereof.

BRIEF DESCRIPTION OF THE DRAWING

A graph showing a relationship between a drying temperature of a flocked metal plate and a change of surfaces of short fibers.

BEST MODE FOR CARRYING OUT THE INVENTION

A flocked metal plate of the present invention is constituted as follows. A synthetic resin adhesive layer which is a short-fiber implanting layer formed on a metal plate or a surface-treated metal plate possesses hydrophilicity. By applying the sufficient moisture absorbing treatment to short fibers implanted in the synthetic resin adhesive layer, the short fibers are formed into hydrophilized short fibers. The short fibers are implanted in the synthetic resin adhesive layer with high flocking density by an electrostatic implanting method as short fiber bundles thus forming a flocked layer which exhibits a strong capillary phenomenon in gaps formed among implanted fibers of the short fiber bundles. Due to such constitution, the flocked layer possesses hydrophilicity and hence, the flocked layer exhibits hydrophilicity, water retention property and water absorbing property. This flocked layer is derived from an idea different from the flocked layer of the conventional flocked metal plate and hence, the flocked layer of the present invention has novelty and an inventive step over the conventional flocked layer. The important technical features of the present invention lie in the selection of a material which constitutes the synthetic resin adhesive layer which is the short-fiber implanting layer, the selection of the short fibers implanted in the synthetic resin adhesive layer, a means for imparting hydrophilicity to surfaces of the short fibers, a means for implanting the short fibers in the synthetic resin adhesive layer at high density thus forming the short fiber bundles, and the selection of heating temperature at the time of drying the flocked layer which is formed by implanting the short fiber bundles formed of the short fibers implanted in the synthetic resin adhesive layer which forms the short-fiber implanting layer.

Hereinafter, the materials and the means which constitute important elements in carrying out the present invention are explained.

(Metal Plate)

A thickness of the metal plate and a kind of the metal plate used in the present invention are not particularly limited. However, the present invention is directed to a technique in which a long metal plate which is wound in a coil-shape and is loaded on an unwinding machine is unwound, an adhesive is applied to a surface of the unwound metal plate by coating using a desired method thus forming a synthetic resin adhesive layer, and short fiber bundles are implanted in the adhesive layer at high density by an electrostatic flocking method, the metal plate is dried by heating and is cooled thus forming a flocked metal plate, and the flocked metal plate is wound in a coil shape by a winding machine. Accordingly, in general, it is desirable to use a metal plate having a thickness of 0.03 to 3.0 mm and possessing workability and strength. As such a metal plate, a cold rolled steel sheet, a surface-treated steel sheet, a stainless steel sheet, an aluminum sheet, an aluminum alloy sheet, a copper sheet, a magnesium alloy sheet, a nickel foil, an iron-nickel alloy sheet or the like can be used.

To enhance an adhesion strength between a surface of the long metal plate and a synthetic resin adhesive or the like which contains an acrylic emulsion-based resin as a main component, chemical treatment such as chromate treatment or phosphate treatment, the formation of an organic or inorganic composite film which does not contain chromium, surface polishing treatment or the like may be preliminarily applied to the surface of the long metal plate at a metal plate manufacturer.

As the surface treated steel sheet, an electroplated steel sheet which is obtained by applying zinc plating, zinc alloy plating, nickel plating, nickel alloy plating, tinplating, copper plating, copper alloy plating or the like to the steel sheet by coating can be used. As the zinc alloy plated steel sheet, a zinc-nickel alloy plated steel sheet, zinc-iron alloy plated steel sheet, a zinc-cobalt plated steel sheet or a zinc-cobalt-molybdenum composite plated steel sheet can be used. As the nickel alloy plated steel sheet, a nickel alloy plated steel sheet which contains phosphorus, boron, tin, cobalt or the like can be used. Further, as the surface treated steel sheet, a hot dip galvanizing steel sheet which contains zinc, aluminum, magnesium, a zinc alloy, an aluminum alloy or a magnesium alloy, a hot dipped zinc-aluminum-magnesium-silicon plated steel sheet, a hot dipped zinc-aluminum plated steel sheet or a hot dipped aluminum plated steel sheet can be also used.

Further, it is also possible to use surface treated steel sheets which are obtained by applying known chemical treatment to these plated steel sheets. For example, chemical treatment such as chromate treatment, phosphate treatment, lithium-silicate treatment, silane coupling treatment or zirconium treatment may be applied to these plated steel sheets. Further, it may be possible to apply organic resin coating treatment which contains a known thermoplastic resin or a known thermosetting resin to the surface of the above-mentioned metal plate or the surface treated steel sheet to which the chemical treatment is applied. In the organic resin coating treatment, as the thermoplastic resin or the thermosetting resin, for example, an organic resin which contains an urethane resin, an acrylic resin, a polyester resin, a fluoro resin, an epoxy resin, a polycarbonate resin, a polyvinyl chloride resin, a polyvinyl acetate resin, an ABS (Acrylonitrile Butadiene Styrene) resin, a polyamide resin, a polyimide resin, a polystyrene resin, a phenolic resin, a urea resin, a melamine resin, an acetal resin or the like can be used. Further, the present invention is also applicable to a metal plate which is obtained by laminating an organic resin film made of a polyolefin resin such as polyethylene or polypropylene, a polyvinyl alcohol resin, an acetate resin, a polystyrene resin, a fluororesin, a polycarbonate resin, a polyamide resin, a polyimide resin, a polyvinylchloride resin, a polyvinylidene chloride resin, a polyester resin, an urethane resin or an acrylic resin to the surface of the above-mentioned metal plate or the surface treated steel sheet which is obtained by applying chemical treatment to the surface treated steel sheet. The organic resin film is not limited to a single-layered film and may be formed of a two-or-more layered film. Further, the organic resin film may be formed of a blended resin which is made of two or more resins selected from a group consisting of the above-mentioned resins.

The synthetic resin adhesive used for flocking the short fibers can be also applied to a surface to which chemical treatment is applied, a surface to which organic resin coating treatment is applied or a surface to which an organic resin film is laminated.

Further, a known organic-based adhesive may be interposed between such a plated surface or such a surface to which chemical treatment is applied and a water soluble synthetic resin adhesive. As the known organic-based adhesive, an epoxy-based adhesive, a polyester-based adhesive, a vinyl-based adhesive, a phenolic adhesive or an isocyanate-based adhesive can be used. The adhesive may be applied to the plated surface or the surface to which chemical treatment is applied so to have a thickness of 5 to 20 μm after drying.

(Synthetic Resin Adhesive Which Constitutes Hydrophilic Synthetic Resin Adhesive Layer)

That is, the synthetic resin adhesive for forming the synthetic resin adhesive layer which constitutes the short-fiber implanting layer for forming the flocked metal plate of the present invention is required to be strongly adhered to the long metal plate or the long surface-treated metal plate for forming the synthetic resin adhesive layer which constitutes hydrophilic short-fiber implanting layer, and is required to form the synthetic resin adhesive layer which constitutes short-fiber implanting layer which can firmly holds the hydrophilized short fibers as short fiber bundles which are implanted in the synthetic resin adhesive layer. Moreover, the synthetic resin adhesive layer forming a short fiber implanting layer has, of course, to be formed as a layer having water resistance, chemical resistance, wear resistance and toughness.

As a material of the synthetic resin adhesive for forming the synthetic resin adhesive layer which satisfies the above-mentioned request and constitutes the short-fiber implanting layer, a water soluble synthetic resin or a solvent-based synthetic resin may be used. However, from a viewpoint of improving workability, it is desirable to use the water soluble synthetic resin. As the water soluble resin, a styrene-acrylate-ester-based emulsion, an acrylic emulsion, a urethane-based emulsion, an acrylic-urethane-based emulsion, a poly-vinyl-alcohol-based resin, a vinyl-acetate-based resin or the like may be used. Particularly, an adhesive which contains the styrene-acrylate-ester-based emulsion as a main component, acquires desired viscosity by mixing an antifoaming agent, a pH MODIFIER, a moistening agent or a viscosity improver to the styrene-acrylate-ester-based emulsion, and allows mixing of pigment or a crosslinking agent therein when necessary is especially desirable as the synthetic resin.

Particularly, when the styrene-acrylate-ester-based emulsion is used as the material of the synthetic resin adhesive, the synthetic resin adhesive is manufactured by a usual emulsion polymerization method. However, to obtain sufficient hydrophilicity, as a surfactant, it is desirable to use 1.0 weight % to 10 weight % of anion activator such as fatty acid soap, alkylsulfonate salt, alkylbenzenesulfonate salt, alkyl sulfo succinate salt or polyoxyethylene alkyl sulfate salt with respect to a monomer mixture. When a content of anion activator is less than 1.0 weight % is used, the synthetic resin adhesive cannot acquire sufficient wettability, and when a content of anion activator exceeds 10 weight %, water resistance is extremely lowered and hence, the use of the synthetic resin adhesive which contains less than 1.0 weight % or more than 10 weight % of anion activator is not preferable.

The styrene-acrylate-ester-based emulsion resin which is the material of the hydrophilic synthetic resin adhesive for forming synthetic resin adhesive layer of the present invention which constitutes the short-fiber implanting layer is selected by taking the above-mentioned fact into consideration. The styrene-acrylate-ester-based emulsion resin used as the synthetic resin adhesive in the present invention is an adhesive which acquires desired viscosity by mixing an antifoaming agent, a PH MODIFIER, a moistening agent, a viscosity improver and a surfactant to the styrene-acrylate-ester-based emulsion, and may allow mixing of pigment or a crosslinking agent therein when necessary. The adhesiveness of the synthetic resin adhesive can be enhanced by introducing a carboxyl group into the styrene-acrylate-ester-based emulsion. As a criterion indicative of a content of carboxyl group, an acid value can be used, and it is desirable that the acid value falls within a range from 5 to 100, and more particularly 10 to 50. It is because when the acid value is less than 5, adhesiveness of the synthetic adhesive with the metal plate is deteriorated, while when the acid value exceeds 100, the stability of solution of the synthetic resin adhesive as emulsion is deteriorated. As the antifoaming agent, silicone oil or a mineral-oil-based antifoaming agent is desirably used. The use of alkaline solution is desirable as the viscosity improver since the alkaline solution also performs the pH adjustment. As the surfactant, a non-ionic surfactant or an anionic-based surfactant may be used. An anionic-based surfactant which includes a carboxyl group, a sulfo group or a sulfate group may more desirably be used.

The surfactant may desirably have the following chemical formulae. Here, symbols R, $R_1$ and $R_2$ indicate alkyl groups.

[Formula 1]

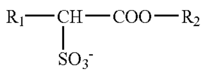

[Formula 2]

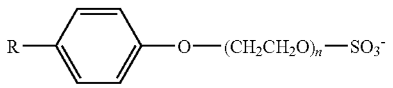

Particularly, $R_2$ having the C number of 12 and R having the C number of 9 is desirable from a viewpoint of ensuring sufficient dispersion and stability of the liquid.

A glass transition temperature of the styrene-acrylate-ester-based emulsion resin is desirably controlled to a value which falls within a range from −30° C. to 20° C. When the glass transition temperature of the resin is set to a value less than −30° C., blocking or a tacking effect occurs after the resin is dried, while when the glass transition temperature of the resin is set to a value which exceeds 20° C., the resin is hardened thus deteriorating bending workability. The viscosity of the resin is desirably adjusted to a value which falls within a range from 5,000 to 40,000 cps/25° C. When the viscosity of the resin is set to a value less than 5000 cps, drying of the resin takes time making the manufacture of the flocked metal plate uneconomical. On the other hand, when the viscosity of the resin exceeds 40,000 cps, a cavity is liable to be easily formed in a film after the resin is dried.

(Means for Applying Synthetic Resin Adhesive for Forming Synthetic Resin Adhesive Layer by Coating)

With respect to a means for applying the above-mentioned synthetic resin adhesive to the surface of the long metal plate or the long surface-treated metal plate by coating, a roll coater system means, a bar coater system means, a spray system means or the like which is usually may be used for applying the adhesive by coating so as to form the adhesive layer. The use of the roll coater system method is particularly desirable. The adhesive coating means does not constitute the technical feature of the present invention. An adhesive layer is formed on one surface of the metal plate in flocking the short fibers on one surface of the metal plate, while an adhesive layer is formed on both surfaces of the metal plate in flocking the short fibers on both surfaces of the metal plate. It is desirable to set a thickness of the adhesive layer to a value which falls within a range from 20 to 80 μm, and more desirably to a value which falls within a range from 20 to 40 μm. When the thickness of the adhesive layer is set to a value less than 20 μm, flocking density (penetration depth) of the short fibers becomes small and hence, the short fibers are liable to be easily removed.

Here, it is needless to say that when it is necessary to form the synthetic resin adhesive layer which constitutes the short-fiber implanting layer and has a desired width or when it is necessary to form such synthetic resin adhesive layers at desired intervals, it is necessary to modify the adhesive coating means to some extent.

As fibers which can be used in electrostatic flocking, chemical fibers such as regenerated fibers, synthetic fibers or semi-synthetic fibers or natural fibers such as plant fibers, animal fibers, carbon fibers or glass fibers may be used. Further, either organic fibers or inorganic fibers may be used. As the organic fibers, known fibers made of nylon, an acrylic resin, a polyester resin, a polypropylene resin, a polyvinyl-chloride resin, a polyvinylidene chloride resin or a fluororesin may be used. Although a suitable length of the fibers may differ depending on a thickness of the adhesive layer, a length of the fibers is desirably set to a value which falls within a range from 0.4 to 1.6 mm.

To apply hydrophilic treatment to the short fibers, an oxide or a hydrous oxide of Al, Ti, Zr, Si, Cr, Ni, Zn, Sn, Mn, Cu, Co, Fe, Mg or Ca or a compound which is a mixture of the oxide and the hydrous oxide of Al, Ti, Zr, Si, Cr, Ni, Zn, Sn, Mn, Cu, Co, Fe, Mg or Ca is applied to surfaces of the short fibers by coating. A method of applying the oxide, the hydrous oxide or the mixture of the oxide and the hydrous oxide to the surfaces of the short fibers by coating is not particularly limited, and a known method may be used. To explain the method specifically, for example, an oxide or a hydrous oxide of Al, Ti, Zr, Si, Cr, Ni, Zn, Sn, Mn, Cu, Co, Fe, Mg or Ca or a compound which is a mixture of the oxide and the hydrous oxide of Al, Ti, Zr, Si, Cr, Ni, Zn, Sn, Mn, Cu, Co, Fe, Mg or Ca is dispersed in an aqueous solution with high concentration, dipping treatment or electrolytic treatment (cathode treatment or anodic treatment) is performed in the dispersion solution so as to form a film made of the compound and having a sufficient film thickness on the surfaces of the short fibers. In case of the short fibers, it is desirable to perform such treatment by the dipping treatment rather than the electrolytic treatment.

Alternatively, polysiloxane or inorganic siloxane may be applied to the surfaces of the short fibers by coating. Siloxane is a compound which includes an Si—O—Si coupling among compounds made of silicon, oxygen and hydrogen. Although disiloxane, trisiloxane and the like which differ in the number of silicon atoms from siloxane exist, in this specification, siloxane also includes disiloxane, trisiloxane and the like. Due to such treatment, moisture in air is absorbed by siloxane so that the electric resistance at the time of flocking the fibers can be adjusted to 10 to 100 MΩ whereby flocked fibers (short fibers) exhibit the excellent adhesiveness with the adhesive and can be flocked uniformly and densely. Further, the flocked fibers can exhibit sufficient hydrophilicity.

In the course of developing the present invention, the inventors of the present invention have considered that it is necessary to impart hydrophilicity to the flocked layer formed on the metal plate or the surface-treated metal plate, that it is necessary to use a synthetic resin adhesive which can make the synthetic resin adhesive layer constituting the short-fiber implanting layer hydrophilic to make the flocked layer hydrophilic, and that it is also necessary to use fibers to which hydrophilic treatment is applied as the short fibers implanted in the synthetic resin adhesive layer. However, in applying the hydrophilic treatment to the short fibers and performing the electrostatic flocking using such short fibers, it is necessary to prevent a possibility that the flying property of the short fibers is deteriorated. Here, the inventors of the present invention have found that moisture absorbing property closely linked with the hydrophilicity and, based on such finding, the inventors of the present invention have come up with an idea to perform the treatment of imparting the maximum moisture absorbing property to the short fibers (this treatment being defined as "hydrophilic treatment") provided that the flying property of the short fibers at the time of performing electrostatic flocking is not obstructed thus forming the hydrophilic flocked layer which is constituted of short fibers to which this treatment is applied.

That is, to impart the hydrophilicity to the fiber-implanted flocked layer, a sufficient quantity of moisture absorbing layer which allows the formation of the moisture absorbing layer having a film thickness of 0.5 to 3 μm is adhered to surfaces of the short fibers of the present invention thus forming the hydrophilized layer on the surfaces of the short fibers leading to the formation of the hydrophilized short fibers.

As a result, the hydrophilized short fibers are liable to be charged more easily compared to the conventional short fibers at the time of performing the electrostatic flocking and hence, at the time of flocking the short fibers, a charge quantity of the short fibers per se is increased and a speed that the short fibers fly in an electric field is elevated whereby the short fibers are firmly flocked to the synthetic resin adhesive layer which constitutes the short-fiber implanting layer.

The above-mentioned hydrophilized short fibers which are implanted in the short-fiber implanting layer which is formed as the hydrophilic synthetic resin adhesive layer already has received the hydrophilic treatment (treatment which allows the short fibers to exhibit sufficient moisture absorbing property) and hence, the hydrophilized short fibers per se possesses the high hydrophilicity and, at the same time, the hydrophilized short fibers are firmly implanted in the synthetic resin adhesive layer. Accordingly, the flocked layer to which the short fibers are implanted becomes a flocked layer which can exhibit higher hydrophilicity and higher water absorbing property compared to the conventional flocked layer.

(Electrostatic Flocking)

The electrostatic flocking method is a technique in which a work which forms an adhesive layer thereon in a state that an adhesive is applied to a surface of the work which faces an electrode in an opposed manner in the inside of an electrostatic flocking chamber is placed in a grounded state, high-voltage static electricity is applied to the electrode, and short fibers are made to fly in an electric field generated between the electrode and the work so that the short fibers are charged and hence, the short fibers are made to erect upright on an adhesive layer formed on a surface of the work in the direction of lines of electric force in the electric field and are implanted in the adhesive layer in a penetrating manner.

However, when the above-mentioned work is long, in implanting the short fibers by an electrostatic flocking method which implants the short fibers in the work while moving the work at a predetermined speed in the inside of an electrostatic flocking chamber having a predetermined length, due to the relationship between a moving speed of the work and air resistance generated by such movement of the work, the short fibers cannot be implanted in an upright erected state resulting in the implanting of the short fibers in a so-called short fiber fallen state.

Besides such a drawback, the work is moved in the electrostatic flocking chamber at the predetermined speed and hence, time during which the short fibers stay in the inside of the electrostatic flocking chamber of the predetermined length is also limited. That is, the electrostatic flocking time in the electrostatic flocking chamber becomes short and hence, it is difficult to implant the short fibers in an ideal dense implanted state.

The faster the moving speed of the work, the above-mentioned phenomenon appears more conspicuously.

The present invention aims at implanting the short fibers in an original upright erected state and in a highly dense state as short fiber bundles in portions to be flocked of the work which forms the adhesive layer on the long metal plate or surface treated metal plate which passes the electrostatic flocking chamber within a predetermined time in a grounded state, and enhancing efficiency of such an operation. For this end, in the present invention, the flocking is performed by arranging two electrodes in the electrostatic flocking chamber.

That is, to apply static electricity to the long work which moves in the electrostatic flocking chamber of the predetermined length at the predetermined speed, first of all, a first electrode to which high-voltage static electricity for generating a strong electric field is applied is arranged at an entrance side of the electrostatic flocking chamber. Next to the first electrode, a second electrode to which high-voltage static electricity lower than the static electricity applied to the first electrode is applied is arranged toward an exit side of the electrostatic flocking chamber.

By arranging the electrodes in the electrostatic flocking chamber in the above-mentioned manner, when the portion to be flocked of the long work is fed into the electrostatic flocking chamber, first of all, in a step in which the long work passes the first electrode, the charged short fibers are implanted firmly and in an upright manner as much as possible in the portion to be flocked of the long work along the strong line of electric force generated by the first electrode.

When the portion to be flocked of the long work passes the second electrode after passing the first electrode, due to the second electrode, the short fibers are implanted in gaps formed among the upright short fibers which are implanted due to the first electrode.

That is, according to the present invention, when the long work passes the first electrode, first of all, due to the first electrode, the electrostatic flocking which firmly implants the short fibers as the upright short fibers which do not fall by the strong electric field is performed. Here, the short fibers which are firmly implanted in an upright manner constitute short fibers which play a role of preventing falling of fibers due to the first electrode. Then, when the long work passes the second electrode, due to the second electrode, the short fibers are electrostatically flocked in the gaps formed among the upright short fibers with an ordinary voltage. When the adhesive is applied to one surface of the metal plate or the surface-treated metal plate preliminarily, the flocking of the short fibers is applied to the surface (one surface) of the metal plate or the surface-treated metal plate to which the adhesive is applied by coating, while when the adhesive is applied to both surfaces of the metal plate or the surface-treated metal plate preliminarily, the flocking of the short fibers is applied to the surfaces (both surfaces) of the metal plate or the surface-treated metal plate to which the adhesive is applied.

By carrying out the electrostatic flocking method in the above-mentioned manner, it is possible to form the upright short fiber bundles on the portions to be flocked of the long metal plate or the long surface-treated metal plate which is the long work moving at a predetermined speed in the electrostatic flocking chamber of the predetermined length at high density (flocking density being approximately 25,000 to 36,000 pieces/$cm^2$ which corresponds flocking density of 72 to 100 g/$m^2$ when short fibers having the length of 0.8 mm and the diameter of 19 μm are used).

Here, by flocking the short fibers at such a high density of 25,000 to 36,000 pieces/$cm^2$ (72 to 100 g/$m^2$) using the above-mentioned short fibers, water droplets can be easily caught in gaps formed among the respective short fibers of the flocked layer thus allowing the flocked layer to effectively exhibit water retention property and water absorbing property. When the flocking density is less than 25,000 (72 g/$m^2$), the respective short fibers are coarsely flocked, while when the flocking density exceeds 36,000 pieces/$cm^2$ (100 g/$m^2$), the respective short fibers are excessively densely flocked and hence, the flocked layer cannot exhibit efficient water retention property and water absorbing property in both cases.

The flocked layer formed on the flocked metal plate of the present invention is manufactured such that the synthetic resin adhesive for forming the synthetic resin adhesive layer which constitutes the hydrophilic short-fiber implanting layer is applied to the surface of the metal plate or the surface-treated metal plate by coating, and the short fibers to which the hydrophilic treatment is applied by the above-mentioned means is flocked to the adhesive-applied surface by electrostatic flocking. Accordingly, the flocked layer which is formed on the flocked metal plate of the present invention becomes a hydrophilic flocked layer in which the short fibers are implanted at high density and hence, due to such implanting intervals of the short fibers of the short fiber bundles implanted in the flocked layer, the flocked layer exhibits an extremely strong capillary phenomenon. The hydrophilic flocked layer is formed as a flocked layer which exhibits hydrophilicity, water retention property and water absorbing property.

(Means Used after Electrostatic Flocking)

After completion of the electrostatic flocking operation, the metal plate or the surface-treated metal plate is passed through the heating drying chamber. In this step, moistures are evaporated from the synthetic resin adhesive which is applied for forming the synthetic resin adhesive layer which constitutes the short-fiber implanting layer formed on the metal plate or a surface-treated metal plate and containing the above-mentioned components and the short fibers which are implanted on the surface of the synthetic resin adhesive and to which the hydrophilic treatment is applied and hence, the synthetic resin adhesive layer and the short fibers are dried. Accordingly, the hydrophilic flocked layer constituted of the synthetic resin adhesive layer and the short fibers is formed. In performing such a drying operation by heating, it is important to adjust the drying-by-heating temperature such that the synthetic resin adhesive layer which is the short-fiber implanting layer and the flocked layer formed of the short fiber bundles made of short fibers implanted in the synthetic resin adhesive layer at high density forms the flocked layer having hydrophilicity, water retention property and water absorbing property.

The inventors of the present invention have found a phenomenon that properties of the flocked layer formed of the short fiber bundles constituted of a mass of the short fibers and the synthetic resin adhesive layer which is the short-fiber implanting layer in which the short fiber bundles are implanted are determined based on drying-by-heating temperature after the electrostatic flocking operation. That is, the inventors of the present invention have found that by changing the drying-by-heating temperature, the flocked layer which is formed by implanting the short fiber bundles constituted of a mass of the short fibers in the synthetic resin adhesive layer which is the short-fiber implanting layer exhibit excellent hydrophobicity or excellent hydrophilicity to the contrary. According to a result of an experiment, as shown in FIG. 1, it is confirmed that the flocked layer possesses hydrophilicity when the drying temperature is less than 150° C. and possesses hydrophobicity when the drying temperature is set to a value which falls within a range from 150 to 250° C. It is estimated that along with the elevation of the drying temperature, a quantity of an OH group or an NH group on surfaces of the synthetic resin adhesive layer which is the short-fiber implanting layer and the treated layers of the short fibers is reduced and hence, the synthetic resin adhesive layer and the treated layer of the short fibers become hydrophobic. Accordingly, to allow the flocked layer to maintain hydrophilicity and to make the flocked metal plate on which the flocked layer is formed exhibit hydrophilicity, it is necessary to perform the drying operation at a temperature of less than 150° C.

Then, the flocked metal plate is passed through a cooling chamber thereby cooled.

Due to the completion of such a step, the synthetic resin adhesive layer which is the short-fiber implanting layer formed using the synthetic resin adhesive is fixedly mounted on the treated surface of the long metal plate or the surface-treated metal plate strongly, densely and in a non-peelable manner (in an anchored state) as the synthetic resin adhesive layer which is the short-fiber implanting layer. Further, the synthetic resin adhesive layer also performs a function of firmly implanting the short fiber bundles formed of a mass of the short fibers implanted in the synthetic resin adhesive layer such that the short fiber bundles can not be pulled out. Accordingly, the synthetic resin adhesive layer does not cause the deterioration of the above-mentioned functions even when dew condensation, the inundation or the like occurs due to a change of weather or a change similar to unusual weather caused artificially and, at the same time, the synthetic resin adhesive layer which is the short-fiber implanting layer forms a film which does not cause cracks even when bending forming is applied to the flocked metal plate.

In using the flocked metal plate which is manufactured by carrying out the present invention and is wound in a roll shape as a roofing material, a duct material or the like, it is needless to say that the flocked metal plate is formed into a flocked metal plate having a desired length and a desired width by cutting the flocked metal plate with the desired length and the desired width. Then, by combining and connecting the roofing materials or the duct materials cut into the desired length and the desired width, it is possible to form a roof or a duct having the desired structure.

(Manufacturing Method of Flocked Metal Plate Having No Flocked Fibers on Sides)

In cutting the flocked metal plate into a plurality of flocked metal plates of the desired length or the desired width which are used as the roofing materials or the duct materials and by combining and connecting these flocked metal plates, when the short fiber bundles are implanted in overlapping portions of sides of the flocked metal plates which constitutes the plurality of construction materials, the short fiber bundles obstruct the connection of the flocked metal plates. To remove such portions of the flocked metal plates which obstruct the connection of the flocked metal plates, it is necessary to perform an operation to cut off the short fibers implanted in the flocked metal plate along the side of the flocked metal plate by a required width.

To overcome such a drawback, inventors of the present invention have developed a technique which forms the flocked metal plate in which the short fiber bundles are not implanted on side edges of the metal plate or the surface-treated metal plate by a desired width or a desired distance.

In this technique, for forming the synthetic resin adhesive layer which is a short-fiber implanting layer on the metal plate or the surface-treated metal plate, an adhesive layer is formed on an adhesive transfer surface of a roller used in a roll coater for applying a synthetic resin adhesive in a state that the adhesive is not applied to a side of the metal plate or the surface-treated metal plate by a required width or a desired distance. Further, an adhesive may be applied by coating to only portions to be flocked using a gravure roll or an offset printing roll.

By forming the adhesive transfer surface of the roller in the above-mentioned manner and by performing the transfer of the adhesive on the roller to the metal plate or the surface-treated metal plate using the roller, an adhesive layer is transferred to the metal plate or the surface-treated metal plate in a state that the adhesive is not applied to a side of the metal plate or the surface-treated metal plate by a required width or a desired distance.

By performing the flocking operation and the drying-by-heating operation in the above-mentioned manner, it is possible to manufacture the flocked metal plate which implants the short fiber bundles on the metal plate or the surface-treated metal plate in a state that the adhesive is not applied to a side of the metal plate or the surface-treated metal plate by a required width or a desired distance.

(Functions which Flocked Metal Plate Performs when Used as Roofing Material)

The roof formed using the flocked metal plate is influenced in various ways due to the change of weather as explicitly explained above. Particularly, being influenced by a natural phenomenon referred to as "radiational cooling phenomenon" which occurs at dawn on a fine day in winter particularly, there arises a phenomenon that a temperature of the flocked metal plate becomes lower than an ambient outdoor temperature by 5 to 6° C. Accordingly, a temperature of a back surface of the flocked metal plate which constitutes the roof is lowered to a dew point or less resulting in the generation of dews on the back surface of the metal plate.

In such a case, a flocked layer of a roof which is formed using a conventional flocked metal plate has none of hydrophilicity, water retention property, and a water absorbing property and hence, the dews fall as water droplets. When this phenomenon occurs, there arises a drawback that a product below the roof or a person below the roof gets wet with fallen water droplets.

As mentioned previously, particularly, some products absorb moisture thus giving rise to drawbacks such as deterioration of commercial values of these products.

With respect to the roof which is formed by using the flocked metal plate manufactured by carrying out the present invention, even when dews are generated in the flocked layer of the flocked metal plate due to the above-mentioned phenomenon referred to as "radiational cooling phenomenon" which occurs in at dawn on a fine day in winter, the flocked layer of the flocked metal plate of the present invention is configured such that, on the synthetic resin adhesive layer which is the short-fiber implanting layer having hydrophilicity, the hydrophilized short fibers which constitute the short fiber bundles are implanted upright at high density as the short fiber bundles and hence, the flocked layer which is constituted of the synthetic resin adhesive layer and the short fiber bundles which is formed by implanting the short fibers on the synthetic resin adhesive layer in the synthetic resin adhesive layer exhibits the hydrophilicity. As the result, the flocked layer also exhibits water retention property and water absorbing property thus preventing the occurrence of a drawback that the person below the roof gets wet with water droplets or the products below the roof gets wet or is moistened by water droplets.

That is, the dews which are generated on proximal ends of the short fiber bundles of the flocked layer are absorbed by the short fiber bundles which are formed of the hydrophilized short fibers which are implanted at high density (having water retention property among the short fibers) and hence, it is possible to prevent the occurrence of the above-mentioned drawback.

Further, for example, when the flocked metal plate is arranged in an inclined manner, the dews are generated on an inclined surface. When the dews are aggregated with each other and reach a saturation point, the dews move along the inclined surface and are led to a desired place and hence, it is possible to prevent the occurrence of a situation that the dews fall at a place where the dews are generated.

Then, the above-mentioned dews are evaporated along with the rising of the sun and the elevation of the roof temperature and, thereafter, the flocked layer is dried.

Further, even if rainwater, snowmelt or the like infiltrates into the short fiber bundles implanted at high density from the outside, a capillary phenomenon is generated among the short fibers which constitute the flocked layer and hence, the above-mentioned rain water or snowmelt is pulled into gaps formed between the short fiber bundles. After a water-retention strength of the flocked layer reaches a saturation point, the dews move downwardly along the inclination of the roof by gravity and reaches a trough.

As described above, the roof formed by using the flocked metal plate of the present invention can prevent the drawbacks such as falling of dew water, infiltrated rain water or the like.

(Function of Flocked Metal Plate Used as Duct Material)

Further, with respect to a duct of an air-conditioning system, as a phenomenon which occurs in summer particularly, after starting an operation of the air-conditioning system, dews may be generated on an outer surface of an air supplying duct before the air-conditioning system reaches a set environmental condition. To prevent such generation of dews, conventionally, a heat insulation operation which wraps a heat insulation material around an outer periphery of the duct is performed.

By forming the duct using the flocked metal plate manufactured by carrying out the present invention, the short fiber bundles which constitutes the flocked metal plate manufactured by carrying out the present invention exhibits some heat insulation function. Even if dews are generated on the duct, the short fiber bundles of the flocked metal plate manufactured by carrying out the present invention exhibit a hydrophilic property and a water retention property in the same manner as the case in which the flocked metal plate is used as the roofing material or the eaves material thus providing a dew falling prevention function whereby the duct is dried under the set environmental condition. Accordingly, the conventional heat insulation operation becomes no more necessary.

Besides the above-mentioned advantageous effect, even if dews are generated on distal ends (or proximal ends) of the short fiber bundles formed on the outer periphery of the duct formed of the flocked metal plate manufactured by carrying out the present invention, due to the function that the short fiber bundles perform, it is possible to prevent falling of the dews thus preventing the occurrence of drawbacks caused by such falling of the dews.

The short fiber bundles which constitutes the flocked metal plate manufactured by carrying out the present invention is formed by implanting the short fibers at high density in an upright manner as described above and hence, the short fiber bundles exhibit an ultraviolet-ray interrupting function thus preventing the deterioration of the synthetic resin adhesive layer.

Although the flocked metal plate according to the present invention has been explained by taking the cases in which the flocked metal plate according to the present invention is used as the roofing material, and the duct material heretofore, it is needless to say that the use of the flocked metal plate according to the present invention is not limited to the formation of the roof or the duct, and is used as a material for forming structures in broader meaning including a construction material.

EMBODIMENT

Embodiment 1

To a surface of a long hot dip galvanizing steel sheet having a thickness of 11.0 mm and plating quantity of 180 $g/m^2$, a synthetic resin which contains styrene-acrylate-ester-based emulsion as a main component is applied by coating as a hydrophilic synthetic resin adhesive using a roll coating method such that a thickness of the synthetic resin after drying is set to 30 μm. Thereafter, short fibers made of nylon are flocked to a surface of the metal plate on which a synthetic resin adhesive layer is formed using an electrostatic method. With respect to the short fibers made of nylon (length: 0.8 mm, diameter: 19 μm), short fibers having surfaces thereof covered with silica of a thickness of 1 μm are used. Flocking of the short fibers by the electrostatic flocking method is performed using two electrodes arranged in the length direction of the steel sheet. A voltage which is firstly applied to a first electrode is set to 40 kV, and a voltage which is applied to a second electrode is set to 30 kV. As a result, the short fibers are flocked at a density of 31,813 pieces/$cm^2$ (84 $g/m^2$). After the short fibers are flocked, the metal plate is dried at a temperature of 140° C., and the dried metal plate is wound. In Table 1, styrene-acrylate ester is styrene-acrylate-ester-based emulsion.

Embodiments 2 to 5, Comparison Example 1

Table 1 shows manufacturing conditions. With respect to items other than the items listed in Table 1, the conditions on these items are set equal to the corresponding conditions of the embodiment 1. With respect to the flocked metal plates which are manufactured under the conditions shown in Table 1, the following characteristics are evaluated, and a result of evaluation is shown in Table 2.

<Flocking Density>

The evaluation "Good" is given when the flocking density of the short fibers is 72 $g/m^2$ or more, and the evaluation "Poor" is given when the flocking density of the short fibers is less than 72 $g/m^2$.

<Boiling Water Test>

A grid pattern is formed on a flocked surface of the flocked metal plate using a cutter, and the flocked metal plate is projected by 6 mm using an Erichsen testing machine such that a flocked surface side of the flocked metal plate projects. Next, the flocked metal plate is immersed in boiled water of 100° C. for 2 hours and, thereafter, a tape peel-off test is performed. The evaluation "Good" is given when the short fibers and the synthetic resin adhesive are not peeled off at all, and the evaluation "Poor" is given when at least some short fibers are peeled off or some synthetic resin adhesive is peeled off.

<Bending Test>

The flocked surface of the flocked metal plate is bent by OT, and a degree of the occurrence of cracks in the synthetic resin adhesive layer and the adhesiveness of the flocked short fibers are evaluated. The evaluation "Excellent" is given when cracks do not occur at all, the evaluation "Good" is given when small cracks occur but there is no problem in a practical use, and the evaluation "Poor" is given when large cracks occur thus causing a problem.

<Friction Test>

A polishing surface of a polishing paper #200 having a size of 2×20 cm is soaked with water, the water-soaked polishing surface is placed on the flocked surface of the flocked metal plate, a weight of 400 g is applied to the polishing paper and is reciprocated 50 times, and adhesiveness of the flocked short fibers is measured. The evaluation "Good" is given when the flocked short fibers are not peeled off at all, and the evaluation "Poor" is given when the flocked short fibers are peeled off.

As shown in Table 2, the embodiments 1 to 5 exhibit the favorable results with respect to both of the flocking density and the adhesiveness of the flocked short fibers (the boiling water test, the bending test and the friction test) without causing any problems.

TABLE 1

| Embodiment or comparison example | Kind of metal plate: Kind of metal plate | Kind of metal plate: Kind of plating | Kind of metal plate: Plating quantity ($g/m^2$) | Chemical treatment: Kind | Chemical treatment: Adhesion quantity ($mg/m^2$) | Synthetic resin adhesive: Kind | Synthetic resin adhesive: Thickness (μm) | Short fibers: Kind | Short fibers: Length (mm) | Short fibers: Diameter (μm) |
|---|---|---|---|---|---|---|---|---|---|---|
| Embodiment 1 | steel sheet | hot dipped Zn | 180 (both surfaces) | chromate treatment | 30 as Cr | styrene-acrylate ester | 30 | nylon | 0.8 | 19 |
| Embodiment 2 | steel sheet | Electro-lytic Zn | 20 (one surface) | phosphate treatment | 60 as P | styrene-acrylate ester | 20 | nylon | 0.8 | 19 |
| Embodiment 3 | aluminum sheet | — | — | — | — | styrene-acrylate ester | 45 | acrylic | 0.8 | 25 |
| Embodiment 4 | SUS304 | — | — | — | — | urethane-based emulsion | 39 | polyester | 0.6 | 10 |
| Embodiment 5 | steel sheet | hot dipped Zn-55% Al | 180 (both surfaces) | phosphate treatment | 100 as P | acrylic-urethane-based emulsion | 80 | nylon | 0.9 | 29 |
| Comparison example 1 | steel sheet | hot dipped Zn | 180 (both surfaces) | phosphate treatment | 60 as P | styrene-acrylate ester | 10 | nylon | 0.8 | 19 |

TABLE 2

| Embodiment or Comparison example | Characteristics evaluation result: Flocking density ($g/m^2$) | Adhesiveness of flocking: Boiling water test | Adhesiveness of flocking: Bending test | Adhesiveness of flocking: Friction test |
|---|---|---|---|---|
| Embodiment 1 | 84 | Good | Good | Good |
| Embodiment 2 | 72 | Good | Good | Good |
| Embodiment 3 | 100 | Good | Good | Good |
| Embodiment 4 | 73 | Good | Good | Good |

TABLE 2-continued

| Embodiment or Comparison example | Characteristics evaluation result: Flocking density ($g/m^2$) | Adhesiveness of flocking: Boiling water test | Bending test | Friction test |
|---|---|---|---|---|
| Embodiment 5 | 90 | Good | Good | Good |
| Comparison Example 1 | 50 | Poor | Good | Poor |

(Relationship Between Heating Temperature and Hydrophilicity of Short Fibers)

After drying short fibers for implanting on which hydrophilicity treatment is applied to the surface thereof for 15 minutes by heating in the temperature of 130° C., 140° C. and 150° C., the short fibers are left in a temperature atmosphere of room temperature for one hour. A cup is filled with water and 0.5 g of the short fibers to which the above-mentioned dry treatment by heating is applied and is made to float on a water surface of water. As a result, a sinking (precipitating) time of the short fibers in water is as follows. The short fibers treated at a heating temperature of 130° C. takes 0.25 seconds for sinking in water, the short fibers treated at a heating temperature of 140° C. takes 0.29 seconds for sinking in water and the short fibers treated at a heating temperature of 150° C. takes five minutes or longer for sinking in water. With respect to the short fibers treated at heating temperatures of 130° C. and 140° C., times that the short fibers take in sinking in water are very short. This result shows that surfaces of the short fibers have hydrophilicity and water absorbing property.

Further, hydrophilicity and water absorbing property of the surfaces of the short fibers are lowered at a heating temperature of 150° C. This result shows that the surfaces of the short fibers become hydrophobic (water-repelling) at a heating temperature of 150° C. or more. Accordingly, hydrophilicity which the flocked layer possesses can be changed by changing the heating temperature. The following search is carried out to find out reasons of such a phenomenon.

That is, short fibers for flocking whose surfaces to which hydrophilic treatment is applied are dried by heating at temperatures of 130° C., 140° C., 150° C. and 160° C. for two minutes, and a peak intensity of 3343 $cm^{-1}$ derived from Si—O and a peak strength of 1071 $cm^{-1}$ derived from O—H or N—H are measured using an infrared spectrophotometry, and the relationship between the peak value of 3343 $cm^{-1}$/peak value of 1071 $cm^{-1}$ and the heating temperatures is shown in FIG. 1. In FIG. 1, an intensity ratio (peak intensity of 3343 $cm^{-1}$/peak intensity of 1071 $cm^{-1}$) is taken on an axis of ordinates and the heating temperature is taken on an axis of abscissas. A case in which the short fibers for flocking are not heated is also shown in FIG. 1. As can be understood from FIG. 1, along with the elevation of the heating temperature, the intensity ratio (peak intensity of 3343 $cm^{-1}$/peak intensity of 1071 $cm^{-1}$) is decreased. At the heating temperature of 140° C. or less, a large quantity of O—H or N—H is present on the surfaces of the short fibers and hence, the short fibers exhibit hydrophilicity whereby it is considered that the short fibers possess excellent water retention property. However, when the heating temperature is 150° C. or more, a quantity of O—H or N—H on the surfaces of the short fibers is decreased and hence, it is considered that hydrophilicity of the short fibers is deteriorated.

Accordingly, by heating the short fibers at a temperature less than 150° C., the hydrophilicity of the short fibers is maintained and hence, the flocked metal plate which exhibits excellent water retention property can be manufactured whereby the roofing material or the air-conditioning system duct formed of the flocked metal plate can make falling of water droplets difficult.

(Water Absorption Function of Flocked Metal Plate)

One end of a flat flocked metal plate manufactured by carrying out the present invention is immersed in water contained in a vessel filled with water, an angle θ between the flocked metal plate and a water surface is changed, and a length of a portion of the flocked metal plate soaked with water above a water surface is measured. When the flocked metal plate is placed perpendicular to the water surface, the flocked layer of the flocked metal plate is soaked with water by 42 mm above the water surface. The length of the flocked layer soaked with water is 50 mm when tan θ is 1.5, the length of the flocked layer soaked with water is 86 mm when tan θ is 0.42, the length of the flocked layer soaked with water is 250 mm when tan θ is 0.12, and the length of the flocked layer soaked with water is 662 mm when tan θ is 0.07. This result implies that the flocked metal plate manufactured by carrying out the present invention exhibits not only excellent hydrophilicity and excellent water retention property but also a strong capillary phenomenon leading to an excellent water absorbing property. Accordingly, when the flocked metal plate manufactured by carrying out the present invention is used as a roofing material and the flocked layer of the flocked metal plate forms a lower surface of the roofing material, there is almost no falling of water droplets from the flocked layer of the flocked metal plate soaked with water during raining and hence, there is no possibility that a clothing of a person below the roof is stained with the water droplets. Further, when the flocked metal plate manufactured by carrying out the present invention is used as the air-conditioning system duct, there is no falling of water droplets formed by dew condensation on the flocked layer of a duct material and hence, even when a person is below the air-conditioning system duct, there is no possibility that a clothing of the person is soaked with the water droplets from the flocked layer of the flocked metal plate soaked with water.

(Water Absorption Test)

A flocked sample of a flocked metal plate according to the present invention (hydrophilized short fibers (hydrophilic piles) being flocked in the hydrophilic synthetic resin adhesive layer) and a flocked sample of a flocked metal plate which is formed by flocking short fibers (regular piles) in a usual synthetic resin adhesive layer are respectively prepared, and these flocked samples are compared with each other with respect to water absorbing property.

The respective flocked samples are placed vertically in water having a depth of 42 mm in a stationery state, and an absorption height of water (absorption length above water surface) is measured with respect to the flocked samples after 40 minutes.

As a result, the water absorption length of the regular piles is approximately 0 mm, while the water absorption length of the hydrophilic piles is 50 mm. Further, when water is dropped on a surface of the flocked piles using a dropping pipette, water is formed into a spherical shape and does not soak into the flocked piles with respect to the former flocked sample, while water is immediately soaked into the flocked piles without forming a spherical shape. From the above result, it is understood that the hydrophilic piles exhibit excellent hydrophilicity, excellent water retention property and excellent water absorbing property compared to the conventional regular piles.

INDUSTRIAL APPLICABILITY

The short fiber bundles of the flocked metal plate according to the present invention are formed into short fiber bundles in a state that the short fibers are flocked at high density in the synthetic resin adhesive layer applied to the long metal plate or the surface treated metal plate by coating in the electrostatic flocking chamber which includes two electrodes for forming the flocked metal plate of the present invention.

The short fiber bundles exhibit the ultra-violet-ray interruption function thus exhibiting the function of preventing the deterioration of the synthetic resin adhesive layer. Further, when the short fiber bundles are dried at a temperature below 150° C., the short fiber bundles exhibit excellent water retention property and excellent water absorbing property by maintaining hydrophilicity of the short fibers and hence, even when the dews are generated in the flocked layer of the roof, the eaves or the duct formed of the flocked metal plate in winter, the short fiber bundles exhibit the function of preventing falling of the dews as water droplets. Further, the short fiber bundles possesses water retention property by maintaining hydrophilicity also in rainy days and hence, when the metal plate flocked with the short fibers is used to form a lower surface of the roof, no water droplets fall and hence, there is no possibility that a clothing of a person is stained with water droplets.

As has been explained, the flocked metal plate according to the present invention exhibits excellent hydrophilicity, excellent water retention property and excellent water absorbing property and hence, the flocked metal plate according to the present invention is used not only as the roofing material or the duct material but also as a material for various applications including the formation of a desired structure which is required to satisfy hydrophilicity, water retention property and water absorbing property.

The invention claimed is:

1. A flocked metal plate having a flocked layer which is formed by implanting short fibers as flocked fiber bundles in a synthetic resin adhesive layer which is formed on at least one surface of a metal plate or a surface-treated metal plate, wherein the synthetic resin adhesive layer is formed of a hydrophilic synthetic resin adhesive layer, the flocked fibers implanted in the synthetic resin adhesive layer are formed of hydrophilized flocked fibers, the flocked fibers are implanted in the synthetic resin adhesive layer to form the flocked layer having the flocked fiber bundles, whereby the flocked metal plate has the flocked layer which exhibits hydrophilicity, water retention property and water absorbing property.

2. A flocked metal plate according to claim 1, wherein the hydrophilic synthetic resin adhesive layer is made of a synthetic resin which contains styrene-acrylate-ester copolymer as a main component.

3. A flocked metal plate according to claim 1, wherein the hydrophilized flocked fibers have surfaces thereof covered by coating with an oxide or an hydrous oxide of Al, Ti, Zr, Si, Cr, Ni, Zn, Sn, Mn, Cu, Co, Fe, Mg or Ca, or a compound which is a mixture of the oxide and the hydrous oxide of Al, Ti, Zr, Si, Cr, Ni, Zn, Sn, Mn, Cu, Co, Fe, Mg or Ca.

4. A flocked metal plate according to claim 1, wherein the hydrophilized flocked fibers have surfaces thereof covered by coating with a film which contains polysiloxane or an inorganic siloxane-based compound.

5. A manufacturing method of a flocked metal plate comprising the steps of:

unwinding a continuous metal plate or a continuous surface-treated metal plate formed in a roll shape;

applying a synthetic resin adhesive for forming a synthetic resin adhesive layer which constitutes a flocked-fiber implanting layer which exhibits hydrophilicity to at least one surface of the unwound continuous metal plate or the unwound continuous surface-treated metal plate by coating, electrostatically flocking hydrophilized flocked fibers on a synthetic-resin-adhesive applied surface at density of between 25,000 to 36,000 pieces/$cm^2$, wherein the continuous metal plate or the continuous surface-treated metal plate to which the synthetic resin adhesive is applied by coating is passed through an electrostatic flocking chamber in such a manner that the continuous metal plate or the continuous surface-treated metal plate passes a first electrode to which high-voltage static electricity is applied and, thereafter, passes a second electrode to which a high-voltage static electricity lower than the high-voltage static electricity applied to the first electrode is applied thus performing electrostatic flocking which implants the hydrophilized flocked fibers in an erected manner to form flocked fiber bundles in a process that the continuous metal plate or the continuous surface-treated metal plate passes the electrostatic flocking chamber; and drying by heating and cooling the metal plate or the surface-treated metal plate thus forming the synthetic resin adhesive layer and the flocked fiber bundles constituted of the flocked fibers as a flocked layer which maintains hydrophilicity on the metal plate or the surface-treated metal plate; and winding the metal plate or the surface-treated metal plate on which the synthetic resin adhesive layer and the flocked layer are formed in a roll shape.

6. A manufacturing method of a flocked metal plate according to claim 5, wherein the synthetic resin adhesive layer is formed such that the synthetic resin adhesive is applied to a whole surface of an adhesive coating roll, the synthetic resin adhesive is removed from a portion of a roll surface of the adhesive coating roll corresponding to a portion of the metal plate or the surface-treated metal plate in which the flocked fibers are not implanted and, thereafter, the synthetic resin adhesive is transferred to the metal plate or the surface-treated metal plate side.

7. A manufacturing method of a flocked metal plate according to claim 5, wherein the synthetic resin adhesive layer is formed such that the synthetic resin adhesive is partially transferred to a metal plate side by applying the synthetic resin adhesive by coating using an adhesive coating roll which has an uneven surface.

8. A manufacturing method of a flocked metal plate according to claim 5, wherein the drying by heating is performed with a temperature of the metal plate set to a value less than 150° C. for maintaining hydrophilicity of the hydrophilized flocked fibers thus allowing the flocked layer to exhibit hydrophilicity, water retention property and water absorbing property.

9. A roofing material which is formed of the flocked metal plate according to claim 1 and wherein a flocked surface of the flocked metal plate is used as a lower surface thereof.

10. A duct for an air-conditioning system which is formed of the flocked metal plate according to claim 1 and wherein a flocked surface of the flocked metal plate is used as an outer surface thereof.

* * * * *